(12) United States Patent
Lyons

(10) Patent No.: US 7,159,128 B2
(45) Date of Patent: Jan. 2, 2007

(54) METHOD AND APPARATUS FOR SELECTIVELY REDUCING THE DEPTH OF DIGITAL DATA

(75) Inventor: George Lyons, Langley (CA)

(73) Assignee: Seiko Epson Corporation, Tokyo (JP)

( * ) Notice: Subject to any disclaimer, the term of this patent is extended or adjusted under 35 U.S.C. 154(b) by 484 days.

(21) Appl. No.: 10/414,742

(22) Filed: Apr. 16, 2003

(65) Prior Publication Data

US 2004/0210786 A1 Oct. 21, 2004

(51) Int. Cl.
G06F 1/26 (2006.01)

(52) U.S. Cl. .................. 713/300; 713/600; 365/230; 341/144

(58) Field of Classification Search ........... 713/320, 713/323, 300, 600; 345/204, 211; 711/100; 365/230; 341/144
See application file for complete search history.

(56) References Cited

U.S. PATENT DOCUMENTS

| | | | | |
|---|---|---|---|---|
| 4,430,709 A | * | 2/1984 | Schleupen | 711/163 |
| 4,843,462 A | * | 6/1989 | Roy et al. | 348/148 |
| 4,860,317 A | * | 8/1989 | Tomlinson | 375/285 |
| 5,121,487 A | * | 6/1992 | Bechtolsheim | 713/600 |
| 5,787,046 A | * | 7/1998 | Furuyama et al. | 365/230.03 |
| 5,961,617 A | | 10/1999 | Tsang | |
| 6,061,754 A | * | 5/2000 | Cepulis et al. | 710/312 |
| 6,075,523 A | | 6/2000 | Simmers | |
| 6,335,898 B1 | * | 1/2002 | Watanabe et al. | 365/230.03 |
| 6,359,625 B1 | | 3/2002 | Perego | |
| 6,445,323 B1 | * | 9/2002 | Cairns et al. | 341/144 |
| 6,556,468 B1 | * | 4/2003 | Garg | 365/104 |
| 6,867,761 B1 | * | 3/2005 | Matsueda | 345/100 |
| 6,900,798 B1 | * | 5/2005 | Heie | 345/211 |
| 2002/0063716 A1 | | 5/2002 | Osborn et al. | |

* cited by examiner

Primary Examiner—Thomas Lee
Assistant Examiner—Sean Weinman
(74) Attorney, Agent, or Firm—Mark P. Watson

(57) ABSTRACT

The invention is directed to a method and apparatus for selectively reducing the depth of digital data. Multiple bit digital data is transmitted to a data receiving device on a plurality of data output lines. Each data output line corresponds, respectively, to a unique one of the bits of the data. A determination is made whether, in the data receiving device, a power saving mode of operation of the device is to be initiated. If so, one or more of the data output lines are selected as non-transmitting data lines, one or more remaining data input lines are driven with corresponding bits of the data, and the non-receiving data lines are placed in a neutral state.

20 Claims, 1 Drawing Sheet

METHOD AND APPARATUS FOR SELECTIVELY REDUCING THE DEPTH OF DIGITAL DATA

FIELD OF THE INVENTION

The present invention relates to a method and apparatus for selectively reducing the depth of digital data, such as the depth of pixel data for display.

BACKGROUND OF THE INVENTION

In computer graphics systems, an image is stored in memory as an array of values with one value provided for each pixel. The dimensions of the array are given by the height and width of the image and the array values determine how the pixel will appear when it is displayed. In a bi-level display, a single bit is provided for each pixel and the pixel can only be displayed as "on" or "off." However, an 8, 16, or 32 bit data word is commonly used for the array values to represent the intensity of each of the color components of a color pixel. For example, an 8-bit data word may represent one of 256 different colors, a 16-bit data word may represent one of 65,536 different colors, and so on. The number of bits associated with each pixel in the image array is referred to as the "depth" of the array. Because the number of bits associated with each pixel also describes how accurately the colors in the image will be rendered, the number of bits is also referred to as the "resolution" of the data word.

When a data word is used to represent the color components of a pixel, typically a color model, such as RGB is used. The RGB color model employs a unit cube subset of the three dimensional Cartesian coordinate system. That is, the X axis represents a primary green value between 0 and 1, the y axis represents a primary blue value between 0 and 1, and the z axis represents a primary red value between 0 and 1. The RGB primary colors are additive; that is, the values that are specified for individual primaries are added together to obtain the desired color. For example, using the notation: (R, G, B), white and black are given, respectively, as (0, 0, 0) and (1, 1, 1). Red is defined as (1, 0, 0) and yellow as (1, 1, 0). In theory, the primaries may take any value between 0 and 1. In practice, however, the primaries can only take a fixed number of discrete values. To take a simple example, if the value of a primary is represented by a 2-bit binary number, the four discrete values are possible: 00, 01, 10, 11. If a 3-bit binary number is used, eight values are possible: 000, 001, 010, 011, 100, 101, 110, 111. In the binary number system, the "least significant bit" or LSB is the right-most bit. The LSB adds to the number of colors that can be specified. For example, using a 2-bit system, yellow is defined as (11, 11, 00). If three bits are used, the LSB allows for several additional shades of yellow: (111, 111, 000), (110, 11, 000), (111, 110, 000), and (110, 110, 000).

While the terms "resolution" and "depth" are used synonymously to describe the third dimension of the image array, the terms are not limited to visual images or graphics systems. More generally, the number of bits used to express digital data provides the resolution or depth of the data word. For example, an eight bit data word may be used to represent data of any type to a resolution of 1 part in 256, and a 16 bit data word may represent data to a resolution of one part in 65,536.

The analog-to-digital ("A/D") converter provides an example of the use of these terms outside the realm of graphics systems. The function of an A/D converter is to produce a data word that represents the magnitude of a voltage or current. Typically, a transducer first converts physical information such as sound, pressure, or temperature into a voltage or current that the A/D converter then uses to create a binary data word. A fundamental specification for an A/D converter is its resolution. If an A/D converter having an 8-bit resolution receives an electrical signal from a microphone, it will convert each sample of the signal into 1 of 256 possible values. A 16-bit A/D converter provides greater resolution by converting each sample into 1 of 65,536 possible values. As this example shows, the resolution of a data word generally means the number of bits used in the data word regardless of the type of information represented digitally. For the reader's convenience, the term "depth" will be used in this specification to refer to the number of bits used in a data word.

Display devices are provided to support a predetermined color depth. For example, a typical liquid crystal display ("LCD") device may support 65,536 (or 64 kB) colors. Such an LCD will therefore be adapted to receive 16 bit color data words from a graphics controller.

A 64 kB color LCD can be used with a graphics controller providing lesser color depth, i.e., data words having fewer than 16 bits. For example, if the graphics controller produces only 8 bit color data words, the LCD will display only 256 different colors instead of the 65,536 colors that it is capable of. The resulting images displayed on the LCD will lack the color depth of images that are defined by full 16-bit color data words, but this may be acceptable in certain circumstances.

Data words are typically provided over parallel data lines to a display device so that each bit of the data word is received on a separate pin. The graphics controller refreshes the display periodically, e.g., at a rate of 70 Hz. In each refresh cycle, the graphics controller provides the display device with an updated value for the color of each pixel of the display. For a 16 bit color display, each of the 16 data lines is refreshed at the refresh rate.

If a particular bit in a data word stays the same from one refresh cycle to the next, the graphics controller simply drives the data line with the same logic value as in the previous refresh cycle. If the particular color bit changes, however, the graphics controller must drive the data line to its opposite logic value. This is referred to as "toggling the pin." (Logic devices recognize the binary logic values of "0" or "1," respectively, as a voltage near 0V or near a higher voltage, such as +3.3V. Thus, when a pin is toggled, the voltage on the pin must be changed.) Toggling the pin consumes significantly more power than driving the data line with the same logic value as in the previous refresh cycle. Further, the power required to toggle a pin is significantly larger than the power required to change a logic value at some point within an integrated circuit, such as a graphics controller. With each additional pin that is toggled in a refresh cycle, more power is used. Since greater color depth requires more color bits and hence more data lines, increasing color depth can appreciably increase power consumption.

While large color depth is generally an attractive feature, it is always desirable to reduce power consumption. This is especially true in portable, battery-powered electronic devices. In devices having a display, a typical method for conserving power is to enter a "power save" mode in which the display controller simply stops refreshing the display after a period of inactivity. A disadvantage of this technique, however, is that the information on the display cannot be seen.

Accordingly, there is a need for a method and apparatus for conserving power in electronic devices having a display that permits information on the display to be seen even while in a power save mode.

SUMMARY OF THE INVENTION

The present invention is directed to a method and apparatus for selectively reducing the depth of multiple bit digital data that is transmitted to a data receiving device on a plurality of data output lines. Each data output line corresponds, respectively, to a unique one of the bits of the data. A determination is made whether a power saving mode of operation of the device is to be initiated. If so, one or more of the data output lines are selected as non-transmitting data lines, one or more remaining data input lines are driven with corresponding bits of the data, and the non-receiving data lines are placed in a neutral state.

Preferably, the data receiving device is a video display and color information is encoded in at least two bits of the data. The lines are selected as non-transmitting lines correspond to one or more of the least significant bits of the at least two bits of the data.

Accordingly, it is an object of the present invention to provide a novel and improved method and apparatus for selectively reducing the depth of digital data.

The foregoing and other objects, features and advantages of the present invention will be more readily understood upon consideration of the following detailed description of the invention, taken in conjunction with the following drawing.

DETAILED DESCRIPTION OF THE EMBODIMENT

Figure 1:
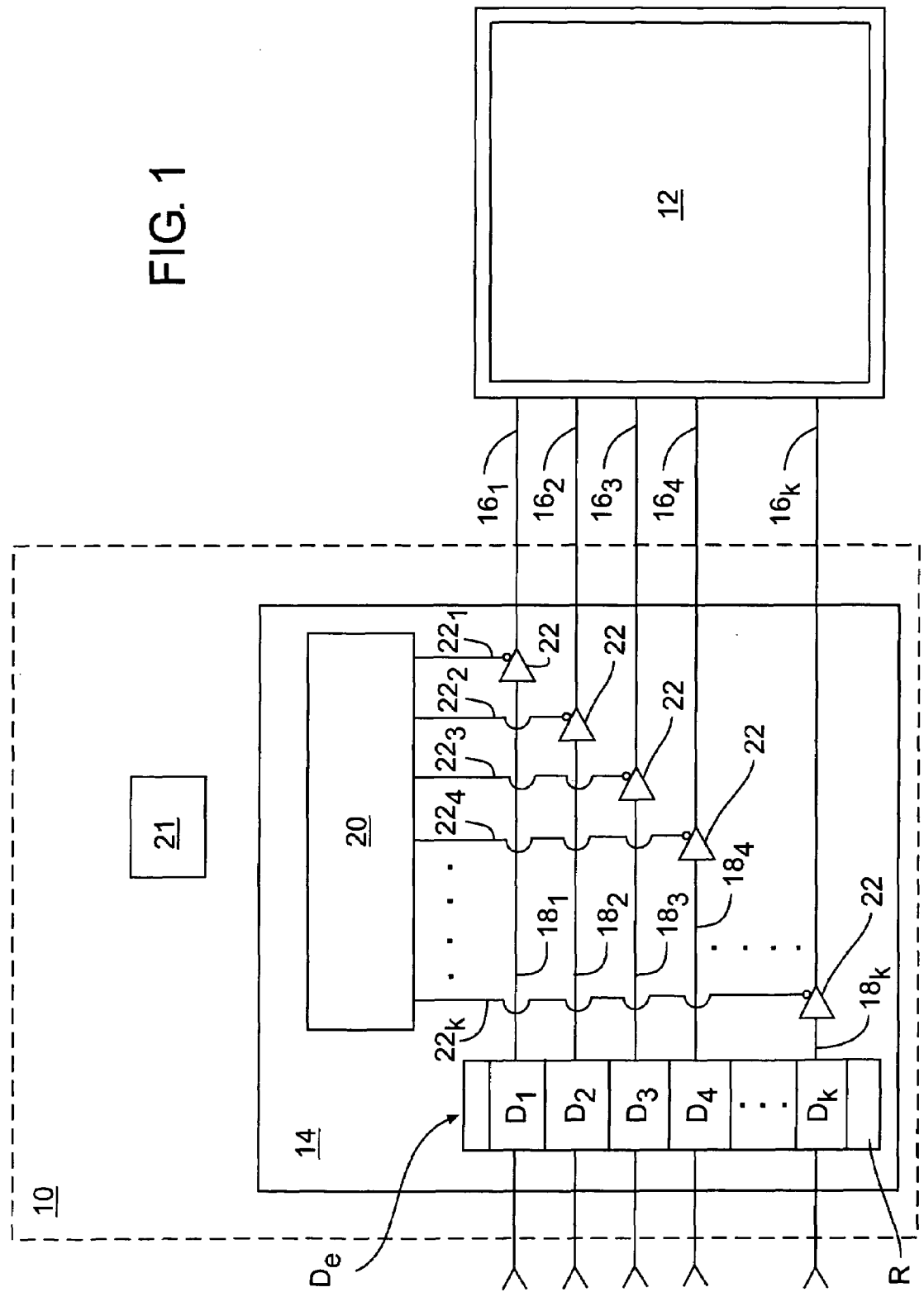
FIG. 1 is a schematic of an apparatus for reducing the depth of digital data according to the present invention.

The present invention is directed to a method and apparatus for conserving power in electronic devices with a display that permits the information on the display to be seen even while in a power save mode. The inventor has recognized that color depth may be traded off for reduced power consumption. Accordingly, FIG. 1 illustrates an apparatus 10 for selectively reducing the depth of digital data according to the present invention. It should be recognized that the invention is not limited in scope to this particular embodiment. The shown apparatus 10 is coupled to a video display 12 and includes a transmitting circuit 14.

The display 12 is typically an LCD having a plurality of input data lines 16 for receiving multiple bit digital data. More particularly, for receiving "k" bits of digital data "D," i.e., bits $D_1, D_2, \ldots D_k$, the display 12 includes "k" data input lines $16_1, 16_2, \ldots 16_k$, for receiving "k" bits of digital data "D," i.e., bits $D_1, D_2, \ldots D_k$ where "k" is commonly 16. A single exemplary data word "$D_e$," is shown in a data register "R" of the apparatus 10 in FIG. 1. The data "D" can have any origin; however, in a preferred context it is typically provided by an internal module of a graphics controller.

The bits "k" of the data "D" in a preferred context of the invention are all used to encode color, so that each data word defines the color of a corresponding pixel on the display, and "k" bit data therefore encodes $2^k$ different colors. Further, the data word may have three fields for defining the values of three primary colors. More generally, the data may have any desired significance or meaning, such as sound, temperature, or pressure. Moreover, the bits "k" of each data word may define a shade in a gray-scale model. Where color is encoded in the data, color bits may be included with bits encoding other features or information, including control information, without departing from the principles of the invention. Further, where color is encoded in the data, any color model now known or later developed may be used.

In cooperation with the display 12, the transmitting circuit 14 includes "k" data output lines 18, i.e., $18_1, 18_2, \ldots 18_k$, coupled to the respective data input lines 16. The data "D" is provided by the transmitting circuit 14 to the data input lines 16 by the output lines 18.

The data "D" is normally provided to the data register R at the rate required for refreshing the display. Whenever one of the data input lines 16 toggles, the apparatus consumes additional power. This toggling may occur especially frequently on the lines corresponding to the LSBs of the data. (It will be appreciated that many physical quantities generally change gradually, thus the LSBs will generally change more frequently then the more significant bits.) According to the invention, it is desired to reduce the number of bits of the data "D" provided to the display 12 as a means to selectively reduce power consumed by the display.

For this purpose, the transmitting circuit 14 includes a switching portion 20 for selectively turning on or turning off particular data input lines 16. The switching portion 20 is preferably adapted to respond to a user accessible switch 21 enabling a user of the apparatus 10 to command the apparatus to initiate a power saving mode of operation. Alternatively, the switching portion 20 may be automatically activated after a period of inactivity. The switch 21 may be displayed on or incorporated in the display 12 or provided remotely from the display. The switch 21 is preferably accompanied by user readable indicia indicating that operation of the switch 21 will cause a decrease in the power consumed by the display 12. Such indicia may be printed or displayed, on or in connection with the switch 21 and may include graphics, text, or both. For example, the indicia might comprise the text "power save" as part of a clickable icon on the display 12. The switching portion 20 of the apparatus 10 is adapted to selectively place selected data input lines 16 in a "neutral" state, i.e., a state which is non-responsive to changes in the binary values stored in data register R This is generally provided by causing the output data lines 18 to assume a high impedance condition. For this purpose, the output data lines 18 may be coupled to the input lines 16 via output control buffers 22 that permit at least two states of operation, i.e., "transparent" and neutral. In the transparent state, the bit value in data register R appears on the input data line 16. In the neutral state, the data input line 16 is non-responsive (or neutralized with respect) to changes in the bit value in the data register R. Specifically, the data input line 16 does not toggle with changes in the bit value in the data register R.

The placement of input lines 16 in a neutral state is most straightforwardly implemented by employing output control buffers 22 having control lines $22_1, 22_2, \ldots 22_k$, coupled to and controlled by the switching portion 20. However, unless it is desired to be able to neutralize any combination of the output lines 16, it is not necessary to provide individual control of the output control buffers 22 on each data output line, and groups of the lines may be controlled together. The switching portion 20 may be implemented as a processor, a logic or gate array, or by any other means known in the art.

Further, any other method known in the art for placing an input line 16 in a neutral state may be employed.

The apparatus 10 may be operated without regard to the provision of new data to the apparatus at the refresh rate of the display 12 by operating the switching portion 20 to neutralize a desired number of the data output lines 18. Preferably, data output lines 18 which correspond to one or more LSBs are neutralized. For example, pixel data having 16 color bits can represent 65,356 different colors for a pixel. If the data output lines 18 corresponding to two of the bits are neutralized, the remaining 14 bits of data can represent 16,384 different colors for each pixel, providing a reduction in the color depth of 75%. While this is a large reduction, a resolution of 16 k colors may be wholly acceptable to the user. This is especially true when the LSBs are neutralized because as the human eye may find it difficult to perceive small changes in color. Moreover, the reduction in color depth provides power consumption advantages that are particularly desirable in battery powered electronic devices having a display.

The apparatus 10 may provide for selectable levels of depth reduction to allow the user to more precisely tailor the desired trade-off between depth and power consumption. For example, the switching portion 20 may be adapted to permit the user to select between neutralizing 1 bit of the data to provide a 50% reduction in the depth of the data, or 2 bits to provide a 75% reduction in depth, or 3 bits to provide an 87.5% reduction in depth, where the data has at least 4 bits. The depth reduction generally is $\frac{1}{2}^n$ where n is the number of bits that are neutralized in data having at least n+1 bits. On the other hand, the reduction in power consumption as a result of neutralizing a bit depends on the likelihood that the bit will toggle, and is typically greatest for the least significant bit where this likelihood is typically highest. Accordingly, while increasing the number of bits that are neutralized according to the invention provides a diminishing loss of resolution, it also provides a potentially diminishing decrease in the power consumption. However, the loss in depth resulting from neutralizing an additional bit is reduced geometrically, while the rate of improvement in power consumption is generally not reduced as much, which generally favors neutralizing as many bits as can be tolerated by the user of the data if power consumption is a concern.

It is to be recognized that, while a particular method and apparatus for reducing the depth of digital data has been shown and described as preferred, other configurations and methods could be utilized, in addition to those already mentioned, without departing from the principles of the invention.

The terms and expressions which have been employed in the foregoing specification are used therein as terms of description and not of limitation, and there is no intention of the use of such terms and expressions of excluding equivalents of the features shown and described or portions thereof, it being recognized that the scope of the invention is defined and limited only by the claims which follow.

The invention claimed is:

1. A method for selectively reducing the depth of and transmitting multiple-bit data words in parallel to a data-receiving device that is separate from a data-transmitting device, comprising:

providing a register coupled to a plurality of data-output lines that transmit data stored in the register, the register to store a multiple-bit data word, and each of the data-output lines corresponding, respectively, to a unique one of the bits of the data word;

coupling the data-output lines with corresponding data-input lines of the data-receiving device;

selecting at least one of the data-input lines as a non-transmitting data-input line and selecting the remaining data-input lines as transmitting data-input lines;

causing each of the remaining data-input lines to take the bit value of the corresponding data-output line; and causing the at least one data-input line selected as a non-transmitting data-input line to be non-responsive to changes in the bit value of the corresponding data-output line, wherein, if the at least one data-input line is deselected as a non-transmitting data-input line, the at least one data-input line is caused to be responsive to the bit value of the corresponding data-output line.

2. The method of claim 1, wherein the data-receiving device is a video display, at least two bits of the data word are encoded with color information, and wherein at least one data-input line corresponding to one or more of the least significant bits of the data word is selected as a non-transmitting data-input line.

3. The method of claim 1, wherein at least one data-input line corresponding to one or more of the least significant bits of the data word is selected as a non-transmitting data-input line.

4. The method of claim 3, wherein the selecting of at least one of the data-input lines as a non-transmitting data-input line results from an external command from a user of the device.

5. The method of claim 1, wherein the data-transmitting device is a graphics display controller for periodically refreshing a video display with image data.

6. The method of claim 5, wherein the data-receiving device is a video display, and at least one data-input line corresponding to one or more of the least significant bits of the data word is selected as a non-transmitting data-input line.

7. A data-transmitting device for selectively reducing a depth of and transmitting a multiple-bit data word in parallel to a data-receiving device that is separate from the data-transmitting device, comprising:

a plurality of data-output lines coupled with corresponding data-input lines of the data-receiving device;

a register coupled with the plurality of data-output lines, the register stores the multiple-bit data word, and each data-output line corresponding, respectively, to a unique one of the bits of the data word;

a switching portion for selecting at least one of the data-input lines as a non-transmitting data-input line and selecting the remaining data-input lines as transmitting data-input lines; and a driving portion for:

driving each of the remaining data-input lines with the bit value on the data-output line with which each remaining data-input line is respectively coupled, and causing the at least one data-input line selected as a non-transmitting data-input line to be non-responsive to changes in the bit value on the data-output line with which the at least one data-input line is coupled, wherein, if the at least one data-input line is deselected as a non-transmitting data-input line, the at least one data-input line is caused to be responsive to the bit value of the data-output line the with which the at least one data-input line is coupled.

8. The data-transmitting device of claim 7, wherein the data-receiving device is a video display, at least two bits of the data word are encoded with color information, and wherein the switching portion is adapted for selecting as non-transmitting data lines at least one data-input line corresponding to one or more of the least significant bits of the data word.

9. The data-transmitting device of claim 8, wherein the data-transmitting device is a graphics display controller for periodically refreshing the video display with image data.

10. The data-transmitting device of claim 7, wherein the data-transmitting device includes a buffering portion for buffering the non-transmitting data-input lines.

11. The data-transmitting device of claim 7, further comprising a user-accessible switch for externally commanding the switching portion to select at least one data-input line as a non-transmitting data-input line and to select the remaining data-input lines as transmitting data-input lines.

12. The data-transmitting device of claim 11, wherein the switch is provided with user-readable indicia indicating that operation of the switch initiates a mode of operation in which the depth of data words transmitted to the data-receiving device is reduced.

13. The data-transmitting device of claim 7, wherein the data-transmitting device is a graphics display controller for periodically refreshing a video display with image data.

14. The data-transmitting device of claim 13, wherein the switching portion is adapted for selecting as non-transmitting data lines at least one data-input line corresponding to one or more of the least significant bits of the data word.

15. A system for selectively reducing a depth of and transmitting a multiple-bit data word in parallel to a data-receiving device that is separate from a data-transmitting device, comprising:
the data-receiving device having a plurality of data-input lines; and
the data-transmitting device to transmit data words to the data-receiving device, the data-transmitting device including:
a plurality of data-output lines coupled with corresponding data-input lines of the data-receiving device;
a register coupled with the plurality of data-output lines, the register stores the multiple-bit data word, and each data-output line corresponding, respectively, to a unique one of the bits of the data word;
a switching portion for selecting at least one of the data-input lines as a non-transmitting data-input line and selecting the remaining data-input lines as transmitting data-input lines; and
a driving portion for:
driving each of the remaining data-input lines with the bit value on the data-output line with which each remaining data-input line is respectively coupled, and
causing the at least one data-input line selected as a non-transmitting data-input line to be non-responsive to changes in the bit value on the data-output line with which the at least one data-input line is coupled, wherein, if the at least one data-input line is deselected as a non-transmitting data-input line, the at least one data-input line is caused to be responsive to the bit value of the data-output line the with which the at least one data-input line is coupled.

16. The system of claim 15, wherein the data-receiving device is a video display, at least two bits of the data word are encoded with color information, and wherein the switching portion is adapted for selecting as non-transmitting data lines at least one data-input line corresponding to one or more of the least significant bits of the data word.

17. The system of claim 15, further comprising a user-accessible switch for externally commanding the switching portion to select at least one data-input line as a non-transmitting data-input line and to select the remaining data-input lines as transmitting data-input lines.

18. The system of claim 17, wherein the switch is provided with user-readable indicia indicating that operation of the switch invokes a mode of operation in which the depth of data words transmitted to the data-receiving device is reduced.

19. The system of claim 15, wherein the data-transmitting device is a graphics display controller for periodically refreshing a video display with image data.

20. The system of claim 19, wherein the switching portion is adapted for selecting as non-transmitting data lines at least one data-input line corresponding to one or more of the least significant bits of the data word.

* * * * *

UNITED STATES PATENT AND TRADEMARK OFFICE
CERTIFICATE OF CORRECTION

| | | |
|---|---|---|
| PATENT NO. | : 7,159,128 B2 | Page 1 of 1 |
| APPLICATION NO. | : 10/414742 | |
| DATED | : January 2, 2007 | |
| INVENTOR(S) | : George Lyons | |

It is certified that error appears in the above-identified patent and that said Letters Patent is hereby corrected as shown below:

Column 5

Line 58, please change "reducing the" to --reducing a--; and

Column 6

Line 7, please change "value of the corresponding data-output line; and " to --value of the data output line with which each remaining data-input line is respectively coupled; and--

Column 6

Line 10, please change "bit value of the corresponding data-output line, wherein," to --bit value of the data-output line with which the at least one data-input line is coupled, wherein,-- and Column 6

Line 14, please change "value of the corresponding data-output line." to --value of the data-output line with which the at least one data-input line is coupled.--

Signed and Sealed this

Eighth Day of April, 2008

JON W. DUDAS
*Director of the United States Patent and Trademark Office*